United States Patent Office 2,959,462
Patented Nov. 8, 1960

2,959,462

TREATMENT OF AQUEOUS SOLUTIONS TO REDUCE FERRIC ION TO FERROUS ION

Mayer B. Goren, Denver, Colo., assignor to Kerr-McGee Oil Industries, Inc., a corporation of Delaware No Drawing. Filed June 13, 1958, Ser. No. 741,716

27 Claims. (Cl. 23—14.5)

This invention relates to a novel process for treating aqueous solutions to reduce ferric ion to ferrous ion and, more particularly, to the reduction of ferric ion to ferrous ion in an aqueous medium using a soluble substance yielding sulfite ion as the reductant.

In various chemical processes and particularly in the hydrometallurgical art, it is frequently desirable or necessary to reduce ferric ion to ferrous ion in order to permit subsequent processing steps to be practiced without interference of the ferric ion. Examples of such processes include the decomposition of alkali chlorotitanates to produce titanium tetrachloride, the solvent extraction of metal values in hydrometallurgical processes, etc.

The presence of ferric ion in uranium-containing aqueous leach solutions to be solvent extracted with a reactive selective solvent such as the organic amines or the alkyl phosphates is particularly undesirable since ferric ion competes with the uranium values for the reactive component or sites of the selective solvent. Consequently, the effective capacity of the solvent for uranium values is lowered and the extraction efficiency is reduced. In addition, the absorbed ferric ion tends to lower the purity of the extract and poison the solvent, thereby further reducing extraction efficiency.

The deleterious effects of ferric ion may be eliminated by either chelating the ferric ion with a suitable chelating agent or by reducing the ferric ion to ferrous ion. Of these processes, the reduction process is generally preferred in the hydrometallurgical art since the distribution coefficient for ferrous ion usually does not favor the replacement of desired metal values such as uranium with ferrous ion on the reactive components or sites of the selective solvent. The ferric ion content of acidic leach liquors may be reduced by treating the liquor with scrap iron or scrap aluminum and, while the ferric ion content of the liquor is reduced to a low level by this process, certain disadvantages are present which render the process unsatisfactory. For example, the hydrogen produced is a fire and explosion hazard, the free acid content of the liquor is lowered, and cutting oils or other contaminates on the scrap metal present operational problems such as difficulty in phase separation due to the detergent content of the cutting oils. Sulfide-type reductants such as sodium or potassium sulfide also have been used to reduce ferric ion. However, these substances are unsatisfactory due to their offensive odor, poisonous nature, and their ability to precipitate group II metal values such as copper, arsenic, bismuth and lead. Thus, the use of sulfide reductants is avoided wherever possible.

One prospective reductant that would overcome the above-mentioned disadvantages which has been considered for the reduction of ferric ion to ferrous ion is sulfur-dioxide in either the gaseous form or aqueous solution (sulfurous acid). Thermodynamically, sulfur dioxide appears to be ideally suited for this purpose since the sulfite-sulfate ion couple appears to have sufficient potential to readily reduce the ferric-ferrous ion couple. For example, the thermodynamic data for these two couples are as follows:

(1) $H_2O + HSO_3^- \rightarrow SO_4^{--} + 4H^+ + 2e$     $E_0 = -0.2$ v.
(2) $Fe^{+2} \rightarrow Fe^{+3} + e$     $E_0 = -0.7$ v.

Unfortunately, results heretofore were disappointing since the rate of reduction is very slow in the absence of a catalyst and never goes to completion even upon warming the solution to temperatures up to the boiling point of water. In addition, a suitable catalyst has not been available prior to the present invention. As a result, a suitable process for reducing ferric ion to ferrous ion using sulfur dioxide or other suitable substance yielding sulfite ion in aqueous solution as the reductant has not been available to the art although the need for such a process long has been recognized.

It is an object of the present invention to provide a novel process for reducing ferric ion to ferrous ion in an aqueous medium using a soluble substance yielding sulfite ion as the reductant.

It is a further object of the present invention to provide a novel process whereby sulfur dioxide may be used effectively as the reductant when reducing ferric ion to ferrous ion in an aqueous medium.

It is still a further object of the present invention to provide a process for reducing ferric ion contained in hydrometallurgical leach liquors to ferrous ion without over-reducing cations of desired metal values to be recovered in a subsequent processing step.

It is still a further object of the present invention to provide a catalyst useful in reducing ferric ion to ferrous ion by the above-mentioned processes.

Still other objects and advantages of the invention will be apparent to those skilled in the art upon reference to the following detailed description and the specific examples.

In accordance with a presently preferred embodiment of the invention, ferric ion contained in an aqueous medium and in the presence of thiocyanate ion as a catalyst is readily reduced to ferrous ion by means of a reducing agent which is a soluble substance yielding sulfite ion.

The reducing agent for use in practicing the present invention may be any suitable soluble substance which yields sulfite ion in aqueous solution such as, for example, sulfur dioxide, sodium sulfite, potassium sulfite, etc. Generally, however, sulfur dioxide is the preferred source of sulfite ion for economic reasons. Sulfur dioxide may be added to an aqueous medium containing ferric ion to be reduced in the form of an aqueous solution such as, for example, an aqueous solution containing about 5–7% sulfur dioxide by weight (sulfurous acid), or by bubbling sulfur dioxide gas into the ferric ion-containing aqueous medium. Where addition of sulfur dioxide to an aqueous solution is referred to in the specification and claims, it is understood that the sulfur dioxide addition may be by either one or both of the above mentioned alternative methods of addition. Usually, it is preferred that a relatively large excess of reducing agent be added to the aqueous solution to be treated, but in instances where a fast reduction rate or reduction of substantially the entire ferric ion content to the ferrous state are not of importance, approximately stoichiometric amounts may be used in the absense of other more easily reducible substances in the solution. Preferably, about 4 to 20 stoichiometric equivalents of the reducing agent are added to the aqueous solution, based upon the ferric ion content. When sulfur dioxide is the reducing agent, usually it is preferred that the sulfur dioxide dosage be from about 2:1 to about 10:1 on a weight basis of sulfur dioxide ($SO_2$) to ferric ion ($Fe^{+3}$).

The upper limit on the amount of reducing agent to be added to a given ferric ion-containing solution appears to be largely economic in nature as there is substantially no tendency to "over-reduce." Thus, a relatively large excess of reducing agent may be added when desired.

The above-mentioned quantities of reducing agent to be added to a solution when reducing ferric ion to ferrous ion do not include reducing agent that is required for reduction of other substances more easily reduced than ferric ion which may be present in the solution. Thus, when the solution contains substances more easily reduced than ferric ion and which are reducible by the reducing agent in preference to ferric ion, an additional quantity of reducing agent should be added to provide for reduction of such easily reducible substances and thereby assure the presence of sufficient reducing agent for reduction of ferric ion.

When reducing ferric ion to ferrous ion in accordance with the invention, it is essential that the reduction be carried out in the presence of a catalytic amount of a soluble substance which is a source of thiocyanate ion. The source of thiocyanate ion may be any suitable substance which is soluble in water in a catalytic amount and yields thiocyanate ions in aqueous solution such as ammonium thiocyanate, sodium thiocyanate, potassium thiocyanate, etc. Generally, the substance should be present in a concentration of about 1–500 mg./l. when calculated as $NH_4SCN$. When a source of thiocyanate ion other than ammonium thiocyanate is used, then such substance should be added in an amount equivalent in thiocyanate ion content to about 1–500 mg./l. of $NH_4SCN$. An amount of catalyst less than the equivalent of about 1 mg./l. of $NH_4SCN$ does not usually produce a marked increase in the reduction rate, while an amount larger than 500 mg./l. is generally not considered to be economic. However, where it is desirable and economic conditions are not a controlling factor, amounts larger than the equivalent of 500 mg./l. of $NH_4SCN$ may be added. For most applications, the catalyst preferably should be added in an amount equivalent in thiocyanate ion content to about 10–100 mg./l. of $NH_4SCN$.

While the above-mentioned catalyst concentrations are generally effective in all instances, smaller amounts may be used where the aqueous solution containing ferric ion also contains dissolved metal containing substances of those metals, such as vanadium, which are capable of forming polybasic acids. For some reason which is not fully understood at the present time, the presence of appreciable concentrations of such metal values will result in a marked increase in the activity of the catalyst. For example, a vanadyl sulfate content in the solution of at least about 3.5 g./l. results in a substantial increase in the reduction rate, but small amounts such as about 0.25 g./l. have little or no effect on the reduction rate.

The present invention is useful in treating a wide variety of aqueous solutions containing a substance providing ferric ion for the purpose of reducing ferric ion to ferrous ion. The process of the invention may also be used to reduce substances more easily reduced than ferric ion and which are reducible by the reductant described herein. For example, suitable aqueous solutions for treatment in accordance with the present invention include substantially pure solutions prepared by dissolving a ferric salt in water, hydrometallurgical leach liquors containing ferric ion, industrial liquors containing ferric ion, etc. In general, the presence of dissolved substances other than the substance which is the source of ferric ion do not appear to have an adverse effect provided sufficient reducing agent and catalyst are present to reduce any additional substances in the solution which are more easily reducible by the reducing agent than ferric ion, as well as to reduce the ferric ion to ferrous ion.

The rate of reduction at a given dosage of reducing agent and catalyst increases considerably with an increase in temperature. Thus, while ferric ion may be readily reduced to ferrous ion at room temperature in accordance with the invention, it is desirable that the solution be at a temperature between about 125° F. and the boiling point of the solution where a rapid rate of reduction is of importance. In such instances, usually it is preferred that the solution be at a temperature of at least 140–150° F.

The present invention is particularly useful for reducing the ferric ion content of acidic aqueous hydro-metallurgical leach liquors to ferrous ion. For example, to achieve high level solubilization of metal values in processing certain ores, the ores may be leached with a mineral acid under oxidizing conditions or in the presence of an oxidizing agent such as manganese dioxide or sodium chlorate. The leach liquors thus obtained frequently contain considerable quantities of ferric ion as well as ferrous ion, the ratio of the two being reflected roughly in the E.M.F. of the solution. For instance, a leach liquor obtained from a Grants, New Mexico, type uranium ore by such high level solubilization technique will have a high negative E.M.F. such as about −375 to −400 millivolts (platinum vs. saturated calomel electrode) which indicates that the ratio of ferric ion to ferrous ion is relatively high. If the liquor is reduced to an E.M.F. below about −300 millivolts, the ferric ion largely disappears and the thiocyanate test for ferric ion is essentially negative. However, if the reduction proceeds too far, as often is the case when reducing with scrap iron or scrap aluminum, some of the desired metal values may be lost by precipitation. Where the liquor contains both uranium and phosphate values, the loss of uranium by over-reduction and precipitation of uranium as the phosphate must be guarded against. This difficulty is not encountered when sulfur dioxide (sulfurous acid) is the reductant and, in addition, the reduction proceeds at a sufficiently rapid rate to eliminate the need for additional tanks in order to provide for storage of the liquor during the reduction step. For example, in the presence of about 50 mg. of ammonium thiocyanate per liter of liquor and at sulfur dioxide dosages on a weight ratio of sulfur dioxide to ferric ion basis of about 2:1 to 10:1, satisfactory reduction may be achieved in six to eight hours at ambient temperatures; while in the absence of a catalyst, the reduction is incomplete after twenty-four hours. If reduction is completed in six to eight hours, the reduction usually may be accomplished in the surge system or the leach liquor storage tanks without requirement for additional tankage.

The reduction of ferric ion in aqueous solution in accordance with the present invention general proceeds more rapidly at higher pH levels up to the point where the ferric ion content is precipitated (usually about pH 3) but the reduction rate is satisfactory at much lower pH levels such as at a pH of less than 1. Thus, pH levels of about 3 or lower generally are satisfactory. Also, inasmuch as the addition of a soluble substance which is a source of thiocyanate ion to an aqueous solution containing a substance providing ferric ion results in the formation of the well-known ferric thiocyanate complex, it will be readily apparent to those skilled in the art that ferric thiocyanate complex may be employed as the source of thiocyanate ion.

The foregoing detailed description and the following specific examples are for the purpose of illustration only, and are not intended as limiting to the spirit or scope of the appended claims.

EXAMPLE I

A stock solution was prepared by dissolving 1.0 g. of iron wire in hydrochloric acid, oxidizing with conc. $HNO_3$ and boiling down to dryness in the presence of $H_2SO_4$. The residue was taken up in water, diluted to one liter and neutralized with ammonia to pH 1.35. The solution assayed 1.0 g. ferric iron and 20 g. $SO_4^{--}$ per liter, and was treated as follows:

A. 100 ml. aliquots of the above prepared solution were treated at 23° C. with three and six stoichiometric equivalents of $SO_2$ as a 7% aqueous solution with and without added thiocyanate and the E.M.F. levels observed with time. The observed E.M.F. of the stock solution before addition of any reagent was −605 mv. (Pt. vs. sat'd. calomel). The E.M.F. recorded at time "zero" in this example, as well as the following examples, is that E.M.F. observed immediately after addition of the reagents.

*Table I*

| Aliquot | 1 | 2 | 3 | 4 |
|---|---|---|---|---|
| $SO_2$ dosage (stoichiometric equivalents) | 3 | 6 | 3 | 6 |
| $NH_4SCN$ dosage | 0 | 0 | 20 mg. | 20 mg. |

E.M.F. READING IN MILLIVOLTS

| Time (hours): | | | | |
|---|---|---|---|---|
| 0 | −420 | −408 | −448 | −438 |
| 0.5 | −420 | −403 | −403 | −353 |
| 1 | −420 | −400 | −375 | −328 |
| 2 | −419 | −399 | −351 | |
| 3 | −418 | −393 | −341 | −311 |
| 4 | −412 | −391 | −333 | −298 |
| 6 | −409 | −390 | −325 | −289 |
| 8 | −410 | −383 | −319 | −283 |
| 20 | −409 | −380 | −301 | −269 |

This example illustrates that the very slow reaction of ferric ion with $SO_2$ in a system substantially free of contaminant cations is catalyzed significantly by the presence of small amounts of thiocyanate ion.

B. To compare the catalyzed and uncatalyzed reduction rates for a pure ferric salt solution at elevated temperatures, 150 ml. aliquots of the stock ferric salt solution above prepared were warmed to 140° F., and 5 stoichiometric equivalents of $SO_2$ were added as a 6% solution along with zero and 10 mg. of ammonium thiocyanate. The reaction mixture was maintained at 140° F. in a loosely stoppered flask and E.M.F. measurements were taken at five-minute intervals. The results are tabulated below:

*Table II*

| Time (min.) | E.M.F. reading in millivolts | |
|---|---|---|
| | No thiocyanate | 10 mg. $NH_4SCN$ |
| 0 | −390 | −403 |
| 5 | −380 | −322 |
| 10 | −380 | ¹ −305 |
| 15 | −380 | −289 |
| 20 | −378 | |
| 25 | −373 | |
| 30 | −372 | |

¹ Thiocyanate color disappeared.

It is apparent from the above that quite rapid reduction of a pure ferric salt solution by $SO_2$ can be achieved at elevated temperatures in the presence of catalytic quantities of thiocyanate, but not in the absence of the latter.

The following examples further illustrate the reduction of ferric ion to ferrous ion in accordance with the invention when treating acidic aqueous leach liquors obtained by acid leaching two uranium ores in the presence of an oxidizing agent (manganese dioxide or sodium chlorate). The two leach liquors had the following characteristics:

| | Leach Liquor No. 1 | Leach Liquor No. 2 |
|---|---|---|
| $U_3O_8$ (g./l.) | 2.70 | 1.2 |
| $V_2O_5$ (g./l.) | 3.64 | <0.25 |
| $Fe^{+3}$ (g./l.) | 1.85 | 0.34 |
| $Fe^{+2}$ (g./l.) | 1.76 | 1.40 |
| E.M.F. (mv.) | −400 | −375 to −380 |

The above leach liquors gave a very strong test for ferric ion when tested by the thiocyanate or other suitable conventional tests.

EXAMPLE II

Five 100 ml. samples of the clarified liquor No. 1 were treated with 5 ml. of 7% aqueous sulfur dioxide and 0, 1, 2, 5 and 20 mg. of ammonium thiocyanate. An immediate drop in E.M.F. from −400 to −358 mv. resulted upon addition of the aqueous sulfur dioxide. This drop in E.M.F. was attributed to complexing of ferric ion with sulfite ion. The course of the reduction was followed by measuring the E.M.F. with a potentiometer equipped with platinum-saturated calomel electrodes. The results of these measurements are given in Table III.

*Table III*

REDUCTION OF LEACH LIQUOR NO. 1 AT CONSTANT $SO_2$ TREATMENT AND VARYING AMMONIUM THIOCYANATE DOSAGES

| Sample No | 1 | 2 | 3 | 4 | 5 |
|---|---|---|---|---|---|
| $NH_4SCN$ dosage, mg. | 0 | 1 | 2 | 5 | 20 |

E.M.F. READING (mv.)

| Time: | | | | | |
|---|---|---|---|---|---|
| 0 | −358 | | | | |
| 40′ | −345 | −335 | −335 | −323 | |
| 80′ | | | | | −300 |
| 190′ | −348 | −331 | −322 | −312 | |
| 4 hrs | | | | | −272 |
| 4.5 hrs | −345 | −322 | −314 | −302 | |
| 6.25 hrs | −342 | −318 | −310 | −297 | |
| 8 hrs | −342 | −312 | −301 | −290 | |
| 12 hrs | −348 | −307 | −296 | −284 | |
| 16 hrs | | | | | −250 |
| 24 hrs | −352 | −297 | −237 | −280 | |

Sample 5 was extracted at 16 hours with four 20 ml. portions of the hydrogen form of 0.1 N bis-2-ethylhexylphosphoric acid (EHPA) in kerosene. The third raffinate assayed 0.075 g. $U_3O_8$/l. This assay indicated recovery of 97% of the uranium content, and the fourth extraction resulted in a uranium recovery of 99−%.

At about −310 mv., it was noted that the ammonium thiocyanate gave only a very faint test for ferric ion.

EXAMPLE III

Five milliliter portions of 7% sulfur dioxide solution and 0, 2, 10 and 20 mg. portions of ammonium thiocyanate were added to four 100 ml. aliquots of leach liquor No. 2. The fresh untreated leach liquor No. 2 had an E.M.F. of −375 mv. A fifth aliquot of leach liquor No. 2 was treated with potassium permanganate to preoxidize it. This preoxidized sample had an E.M.F. of −405 mv. The preoxidized sample was treated with 5 ml. of 7% sulfur dioxide solution and 10 mg. of ammonium thiocyanate. The rate of reduction of each of the above aliquots of leach liquor was measured at intervals with a potentiometer equipped with platinum-saturated calomel electrodes. The resulting data are tabulated in Table IV.

*Table IV*

REDUCTION OF LEACH LIQUOR NO. 2 AT CONSTANT SULFUR DIOXIDE TREATMENT AND VARYING AMMONIUM THIOCYANATE DOSAGES

| Aliquot No | 1 | 2 | 3 | 4 | 5 |
|---|---|---|---|---|---|
| $NH_4SCN$ dosage (mg.) | 0 | 2 | 10 | 20 | 10 |

E.M.F. READING IN MILLIVOLTS

| Time: | | | | | |
|---|---|---|---|---|---|
| 0 | −350 | | | | |
| 14′ | | | −330 | −320 | −315 |
| 30′ | −349 | | −307 | −303 | |
| 45′ | | −328 | | −292 | −308 |
| 60′ | −348 | −324 | −280 | −277 | −298 |
| 1.5 hrs | −347 | −316 | | −275 | |
| 3.5 hrs | −344 | −295 | −268 | −259 | −272 |
| 6 hrs | −339 | −280 | | | −268 |
| 16 hrs | | | −253 | | −255 |
| 24 hrs | −320 | | | | |

After 24 hours of reduction, aliquot No. 1 still gave a positive thiocyanate color test for ferric ion. Hence, prolonged contact of ferric salt solution with sulfur dioxide in the absence of a thiocyanate catalyst will not result in the reduction of all the ferric ion to ferrous ion in a practical period of time.

After four hours of reduction, aliquot No. 4 was extracted batchwise in four stages using 20 ml. portions of 0.1 N EHPA in kerosene. The raffinate from the third stage extraction assayed 0.025 g. $U_3O_8$/l. Thus, the ammonium thiocyanate catalyst and sulfur dioxide (actually sulfurous acid) did not interfere with the subsequent solvent extraction of metal values from the leach liquor.

EXAMPLE IV

To illustrate the ease with which leach liquor No. 1 may be reduced as compared with liquor No. 2, 100 ml. aliquots of these liquors were treated with a constant amount of ammonium thiocyanate and varying amounts of 7% aqueous sulfur dioxide (sulfurous acid). The results of these treatments are tabulated below in Tables V and VI for leach liquors No. 1 and No. 2, respectively.

*Table V*

RATE OF REDUCTION OF LIQUOR NO. 1 AT CONSTANT AMMONIUM THIOCYANATE LEVELS (5 mg.) AND VARYING SULFUR DIOXIDE DOSAGES

| Aliquot | 1 | 2 | 3 | 4 |
|---|---|---|---|---|
| $SO_2$ dosage (ml.) | 2 | 3 | 4 | 6 |

E.M.F. READING IN MILLIVOLTS

| Time (hours): | | | | |
|---|---|---|---|---|
| 1 | −366 | −350 | −338 | −318 |
| 2.25 | −361 | −342 | −329 | −309 |
| 3.75 | −361 | −340 | −321 | −296 |
| 10 | −361 | −332 | −305 | −271 |

*Table VI*

RATE OF REDUCTION OF LIQUOR NO. 2 AT CONSTANT AMMONIUM THIOCYANATE LEVELS (4 mgs.) AND VARYING SULFUR DIOXIDE DOSAGES

| Aliquot | 1 | 2 | 3 | 4 | 5 |
|---|---|---|---|---|---|
| $SO_2$ dosage (ml.) | 1 | 2 | 3 | 4 | 5 |

E.M.F. READING IN MILLIVOLTS

| Time (hours): | | | | | |
|---|---|---|---|---|---|
| 1 | −357 | −340 | −331 | −320 | −314 |
| 2 | −349 | −330 | −311 | −298 | −293 |
| 4.5 | −343 | −320 | −300 | −288 | −282 |
| 10.5 | −340 | −311 | −290 | −279 | −273 |

From the data tabulated in Tables V and VI, it may be seen that leach liquor No. 1 is more readily reduced than liquor No. 2. Also, the preferred rate of reduction is obtained at a sulfur dioxide to ferric ion ratio of at least about 1.0 to 1 by weight with leach liquor No. 1 (about 4 stoichiometric equivalents) and at an $SO_2$ to ferric ion ratio of at least about 8 to 1 by weight with leach liquor No. 2 (about 16 stoichiometric equivalents).

EXAMPLE V

To illustrate the effect of the presence of dissolved substances containing metals capable of forming polybasic acids, such as vanadium, which are believed to be largely responsible for the difference in the ease of reduction of liquor No. 1 over liquor No. 2, a 100 ml. aliquot of leach liquor No. 2 was doped with 0.35 g. of vanadyl sulfate. This gave the doped aliquot of liquor a $V_2O_5$ content equivalent to that of liquor No. 2. Then, 100 ml. aliquots of the doped and undoped leach liquor No. 2 were treated with 2.2 ml. of aqueous sulfur dioxide reagent and 5 mg. of ammonium thiocyanate. The rate of reduction at 140° F. was determined by measuring the E.M.F. of each of the aliquots of doped and undoped liquors with a potentiometer equipped with platinum-saturated calomel electrodes. The E.M.F. readings thus obtained are tabulated below in Table VII.

*Table VII*

| Time (Min.) | E.M.F. reading in millivolts | |
|---|---|---|
| | Doped (3.7 g./l. $V_2O_5$) | Undoped (<0.25 g./l. $V_2O_5$) |
| 5 | −324 | −332 |
| 10 | −301 | −320 |
| 15 | −289 | −311 |
| 20 | −279 | −303 |
| 25 | −273 | −298 |

EXAMPLE VI

Three 100-ml. samples of leach liquor No. 1 were treated with 5 ml. of 7% aqueous sulfur dioxide and varying amounts of ammonium thiocyanate. The treated samples were warmed to 140° F. and E.M.F. measurements (platinum vs. saturated calomel) were made at intervals. From the results tabulated below in Table VIII, it may be seen that the reduction proceeds very slowly in the uncatalyzed system even at high temperature.

*Table VIII*

REDUCTION OF LEACH LIQUOR NO. 1 AT 140° F.

| $NH_4SCN$ (mg.) | 0 | 1 | 5 |
|---|---|---|---|

E.M.F. READING (MV.)

| Time (min.): | | | |
|---|---|---|---|
| 5 | | −312 | −292 |
| 10 | −300 | −293 | −275 |
| 15 | | −280 | −260 |
| 20 | −280 | −269 | −248 |
| 25 | −270 | −260 | −239 |
| 30 | −268 | −250 | −230 |
| 35 | −268 | −243 | |
| 40 | −268 | −240 | |

EXAMPLE VII

Example was repeated except leach liquor No. 2 was used. The data of Table IX clearly indicate that in the absence of appreciable quantities of vanadium and a soluble thiocyanate catalyst, aqueous sulfur dioxide is a very ineffective reductant even at 140° F.

*Table IX*

REDUCTION OF LEACH LIQUOR NO. 2 AT 140° F.

| $NH_4SCN$ (mg.) | None | 5 |
|---|---|---|

E.M.F. READING (MV.)

| Time (min.): | | |
|---|---|---|
| 5 | −365 | −332 |
| 10 | −361 | −320 |
| 15 | −358 | −311 |
| 20 | −357 | −303 |
| 25 | −357 | |
| 30 | −355 | −300 |
| 35 | −352 | −297 |

What is claimed is:

1. A process for treating an aqueous solution containing a substance providing ferric ion comprising adding a reducing agent for ferric ion to the aqueous solution, the reducing agent being a soluble substance yielding sulfite ion in aqueous solution, and reducing ferric ion to ferrous ion with the reducing agent in the presence of a catalytic amount of a soluble substance which is a source of thiocyanate ion.

2. The process of claim 1 wherein about 4 to 20 stoichiometric equivalents of reducing agent are added to the aqueous solution.

3. The process of claim 1 wherein the substance which is a source of thiocyanate ion is present in an amount equivalent in thiocyanate ion content to 1–500 mg./l. of ammonium thiocyanate.

4. The process of claim 1 wherein the aqueous solution is at a temperature between 125° F. and the boiling point of the solution.

5. The process of claim 1 wherein the E.M.F. of the aqueous solution after treatment with reducing agent is not greater than about —300 millivolts as measured with a platinum-saturated calomel electrode.

6. The process of claim 1 wherein the substance which is a source of thiocyanate ion is selected from the class consisting of ammonium thiocyanate, sodium thiocyanate and potassium thiocyanate.

7. The process of claim 1 wherein about 4 to 20 stoichiometric equivalents of reducing agent are added to the aqueous solution and the substance which is a source of thiocyanate ion is present in an amount equivalent in thiocyanate content to 1–500 mg./l. of ammonium thiocyanate.

8. The process of claim 7 wherein the aqueous solution is at a temperature between 125° F. and the boiling point of the solution, and the E.M.F. of the solution after treatment with reducing agent is not greater than about —300 millivolts as measured with a platinum-saturated calomel electrode.

9. The process of claim 8 wherein the substance which is a source of thiocyanate ion is selected from the class consisting of ammonium thiocyanate, sodium thiocyanate and potassium thiocyanate.

10. A process for treating an aqueous solution containing a substance providing ferric ion comprising adding sulfur dioxide to the aqueous solution, and reducing ferric ion to ferrous ion with the sulfur dioxide in the presence of a catalytic amount of a soluble substance which is a source of thiocyanate ion.

11. The process of claim 10 wherein about 4 to 20 stoichiometric equivalents of reducing agent are added to the aqueous solution.

12. The process of claim 10 wherein the substance which is a source of thiocyanate ion is present in an amount equivalent in thiocyanate ion content to 1–500 mg./l. of ammonium thiocyanate.

13. The process of claim 10 wherein the aqueous solution is at a temperature between 125° F. and the boiling point of the solution.

14. The process of claim 10 wherein the E.M.F. of the aqueous solution after treatment with reducing agent is not greater than about —300 millivolts as measured with a platinum-saturated calomel electrode.

15. The process of claim 10 wherein the substance which is a source of thiocyanate ion is selected from the class consisting of ammonium thiocyanate, sodium thiocyanate and potassium thiocyanate.

16. The process of claim 10 wherein about 4 to 20 stoichiometric equivalents of reducing agent are added to the aqueous solution and the substance which is a source of thiocyanate ion is present in an amount equivalent in thiocyanate content to 1–500 mg./l. of ammonium thiocyanate.

17. The process of claim 16 wherein the aqueous solution is at a temperature between 125° F. and the boiling point of the solution, and the E.M.F. of the solution after treatment with reducing agent is not greater than about —300 millivolts as measured with a platinum-saturated calomel electrode.

18. The process of claim 17 wherein the substance which is a source of thiocyanate ion is selected from the class consisting of ammonium thiocyanate, sodium thiocyanate and potassium thiocyanate.

19. A process for treating an acidic aqueous leach solution containing uranium, vanadium and iron values and having at least a portion of the iron values present as ferric ion comprising adding sulfur dioxide to the aqueous leach solution, and reducing ferric ion to ferrous ion with the sulfur dioxide in the presence of a catalytic amount of a soluble substance which is a source of thiocyanate ion.

20. The process of claim 19 wherein about 4 to 20 stoichiometric equivalents of reducing agent are added to the aqueous leach solution.

21. The process of claim 19 wherein the substance which is a source of thiocyanate ion is present in an amount equivalent in thiocyanate ion content to 1–500 mg./l. of ammonium thiocyanate.

22. The process of claim 19 wherein the aqueous leach solution is at a temperature between 125° F. and the boiling point of the solution.

23. The process of claim 19 wherein the E.M.F. of the aqueous leach solution after treatment with reducing agent is not greater than about —300 millivolts as measured with a platinum-saturated calomel electrode.

24. The process of claim 19 wherein the substance which is a source of thiocyanate ion is selected from the class consisting of ammonium thiocyanate, sodium thiocyanate and potassium thiocyanate.

25. The process of claim 19 wherein about 4 to 20 stoichiometric equivalents of reducing agent are added to the aqueous leach solution and the substance which is a source of thiocyanate ion is present in an amount equivalent in thiocyanate content to 1–500 mg./l. of ammonium thiocyanate.

26. The process of claim 25 wherein the aqueous leach solution is at a temperature between 125° F. and the boiling point of the leach solution, and the E.M.F. of the leach solution after treatment with reducing agent is not greater than about —300 millivolts as measured with a platinum-saturated calomel electrode.

27. The process of claim 26 wherein the substance which is a source of thiocyanate ion is selected from the class consisting of ammonium thiocyanate, sodium thiocyanate and potassium thiocyanate.

References Cited in the file of this patent

UNITED STATES PATENTS

| 880,645 | Haldane et al. | Mar. 3, 1908 |
| 2,199,696 | Fleck | May 7, 1940 |
| 2,231,181 | Brooks | Feb. 11, 1941 |

UNITED STATES PATENT OFFICE
CERTIFICATE OF CORRECTION

November 8, 1960

Patent No. 2,959,462

Mayer B. Goren

It is hereby certified that error appears in the printed specification of the above numbered patent requiring correction and that the said Letters Patent should read as corrected below.

Column 2, lines 4 and 5, for "$E_0^1$", each occurrence, read -- $E^o$ --; column 8, line 42, after "Example" insert -- VI --.

Signed and sealed this 25th day of April 1961.

(SEAL)
Attest:

ERNEST W. SWIDER
Attesting Officer

DAVID L. LADD
Commissioner of Patents